(12) United States Patent
Nilsson et al.

(10) Patent No.: US 11,795,892 B2
(45) Date of Patent: Oct. 24, 2023

(54) SOLAR HEATED CANISTER

(71) Applicant: Ningbo Geely Automobile Research & Development Co., Ltd., Ningbo (CN)

(72) Inventors: Magnus Nilsson, Floda (SE); Ronja Rignäs, Bollebygd (SE)

(73) Assignee: Ningbo Geely Automobile Research & Development Co., Ningbo (CN)

( * ) Notice: Subject to any disclaimer, the term of this patent is extended or adjusted under 35 U.S.C. 154(b) by 0 days.

(21) Appl. No.: 17/693,338

(22) Filed: Mar. 12, 2022

(65) Prior Publication Data
US 2022/0195966 A1 Jun. 23, 2022

Related U.S. Application Data

(63) Continuation of application No. PCT/CN2020/118083, filed on Sep. 27, 2020.

(30) Foreign Application Priority Data

Oct. 3, 2019 (EP) ..................................... 19201268

(51) Int. Cl.
*F02M 25/00* (2006.01)
*F02M 25/08* (2006.01)
*F02D 41/00* (2006.01)

(52) U.S. Cl.
CPC ....... *F02M 25/0854* (2013.01); *F02D 41/004* (2013.01); *F02M 25/0836* (2013.01);
(Continued)

(58) Field of Classification Search
CPC ........... F02M 25/0854; F02M 25/0836; F02M 2025/0881; F02D 41/004;
(Continued)

(56) References Cited

U.S. PATENT DOCUMENTS

| 4,829,968 A | * | 5/1989 | Onufer | ................. | B67D 7/0476 |
| | | | | | 137/844 |
| 5,021,071 A | | 6/1991 | Reddy | | |

(Continued)

FOREIGN PATENT DOCUMENTS

| CN | 101871408 A | 10/2010 |
| CN | 101910599 A | 12/2010 |

(Continued)

OTHER PUBLICATIONS

International Search Report from corresponding International Application No. PCT/CN2020/118083, dated Dec. 31, 2020, 2 pages.
(Continued)

*Primary Examiner* — Phutthiwat Wongwian
*Assistant Examiner* — Sherman D Manley
(74) *Attorney, Agent, or Firm* — TUCKER ELLIS LLP

(57) ABSTRACT

A vehicle includes a combustion engine, a fuel tank connected to the combustion engine, a fuel vapour canister connected to the fuel tank and configured to store fuel vapour from the fuel tank and a fuel vapour canister heating system, wherein the fuel vapour canister heating system comprises a first heat exchanger and a second heat exchanger fluidly connected in series to the first heat exchanger, wherein the first heat exchanger is configured to pick-up heat from a surroundings of the vehicle, such as heat from the sun, and the second heat exchanger is configured to transfer heat picked-up by the first heat exchanger to the fuel vapour canister to heat the fuel vapour canister.

16 Claims, 2 Drawing Sheets

(52) U.S. Cl.
CPC .. *F02D 2200/0606* (2013.01); *F02D 2200/70* (2013.01); *F02M 2025/0881* (2013.01)

(58) Field of Classification Search
CPC ......... F02D 2200/0606; F02D 2200/70; B62D 25/06; B62D 25/10; B60K 2015/03514; B60K 15/035
See application file for complete search history.

(56) References Cited

U.S. PATENT DOCUMENTS

| | | | | |
|---|---|---|---|---|
| 5,349,934 A * | 9/1994 | Miyano | ............... | F02D 41/0032 123/553 |
| 5,474,047 A * | 12/1995 | Cochard | ............... | F02D 41/123 123/576 |
| 6,689,196 B2 * | 2/2004 | Amano | ............... | B01D 53/02 96/112 |
| 6,695,895 B2 * | 2/2004 | Hyodo | ............... | F02M 25/0818 96/111 |
| 6,701,902 B2 * | 3/2004 | Koyama | ............... | F02M 25/08 123/518 |
| 7,114,492 B2 * | 10/2006 | Reddy | ............... | F01N 5/02 123/518 |
| 7,444,996 B2 * | 11/2008 | Potier | ............... | F02M 25/08 123/519 |
| 8,261,531 B2 * | 9/2012 | Gandhi | ............... | F02M 25/089 123/573 |
| 8,330,591 B2 * | 12/2012 | Ziehr | ............... | B60H 1/0075 715/788 |
| 8,333,063 B2 * | 12/2012 | Elwart | ............... | F01N 5/02 60/287 |
| 8,413,433 B2 * | 4/2013 | Lupescu | ............... | F02M 26/35 60/299 |
| 8,448,422 B2 * | 5/2013 | Uhrich | ............... | F02M 25/089 60/284 |
| 9,163,592 B2 * | 10/2015 | Kim | ............... | B60W 20/18 |
| 9,512,791 B1 * | 12/2016 | Dudar | ............... | F02M 25/0872 |
| 11,346,308 B1 * | 5/2022 | Dudar | ............... | F02M 25/0818 |
| 11,493,001 B1 * | 11/2022 | Dudar | ............... | F02M 25/089 |
| 2001/0052292 A1 * | 12/2001 | Ito | ............... | F02M 33/08 55/385.3 |
| 2007/0251511 A1 * | 11/2007 | Potier | ............... | F02M 25/08 123/520 |
| 2007/0284014 A1 * | 12/2007 | Shin | ............... | F02M 37/0082 141/94 |
| 2009/0084363 A1 * | 4/2009 | Reddy | ............... | F02M 27/08 903/902 |
| 2010/0252006 A1 * | 10/2010 | Reddy | ............... | F02M 25/0854 141/59 |
| 2012/0312281 A1 * | 12/2012 | Tsutsumi | ............... | F02M 25/089 123/519 |
| 2017/0107954 A1 | 4/2017 | Kopinsky | | |
| 2017/0114732 A1 | 4/2017 | Dudar | | |
| 2018/0224861 A1 * | 8/2018 | Dudar | ............... | F02M 25/0854 |
| 2019/0055905 A1 * | 2/2019 | Dudar | ............... | F02D 41/004 |
| 2020/0247252 A1 * | 8/2020 | Dudar | ............... | H01M 10/615 |
| 2022/0195966 A1 * | 6/2022 | Nilsson | ............... | F02M 25/0836 |

FOREIGN PATENT DOCUMENTS

| | | |
|---|---|---|
| CN | 103362695 A | 10/2013 |
| CN | 106812599 A | 6/2017 |
| CN | 108761026 A | 11/2018 |
| CN | 109404168 A | 3/2019 |
| DE | 102013220092 A1 | 4/2015 |
| EP | 1619379 A1 | 1/2006 |
| FR | 2909595 A3 | 6/2008 |
| JP | S58220951 A | 12/1983 |
| JP | 2009197598 A | 9/2009 |

OTHER PUBLICATIONS

Search Report from corresponding Chinese Application No. 2020800685661, dated Jun. 28, 2023, 6 pages with translation.

* cited by examiner

SOLAR HEATED CANISTER

RELATED APPLICATION DATA

This application is a continuation of International Patent Application No. PCT/CN2020/118083, filed Sep. 27, 2020, which claims the benefit of European Patent Application No. 19201268.0, filed Oct. 3, 2019, the disclosures of which are incorporated herein by reference in their entireties.

TECHNICAL FIELD

The present invention relates to a vehicle. More specifically, the disclosure relates to a vehicle comprising a canister as defined in the introductory parts of claim 1.

BACKGROUND

As a way to lower the environmental impact of a vehicle comprising a combustion engine, it often comprises an Evaporative Emission Control (EVAP) System. The EVAP seals the fuel system of the vehicle in order to prevent fuel vapours from the fuel tank and fuel system from escaping into the atmosphere. The EVAP comprises a canister that absorbs fuel vapours and it is known that the capacity of the canister is increased if the temperature of the canister is increased. There is a need for continuously improving the EVAP system and lowering the environmental impact of the vehicle.

SUMMARY

It is an object of the present invention to mitigate, alleviate or eliminate one or more of the above-identified deficiencies and disadvantages in the prior art and solve at least the above-mentioned problem.

According to a first aspect there is provided a vehicle comprising a combustion engine, a fuel tank connected to the combustion engine, a fuel vapour canister connected to the fuel tank and configured to store fuel vapour from the fuel tank and a fuel vapour canister heating system, wherein the fuel vapour canister heating system comprises a first heat exchanger and a second heat exchanger fluidly connected in series to the first heat exchanger, wherein the first heat exchanger is configured to pick-up heat from a surroundings of the vehicle, such as heat from the sun, and the second heat exchanger is configured to transfer heat picked-up by the first heat exchanger to the fuel vapour canister to heat the fuel vapour canister.

With surroundings is meant circumstances and conditions by which the vehicle is surrounded, e.g. conditions of the ambient air around the vehicle such as temperature or the amount of solar radiation falling onto the vehicle thereby heating at least the part of the vehicle onto which the solar radiation falls. The sun may cause a direct heating by means of the incoming solar radiation on the vehicle itself or indirect heating by heating the ambient air around the vehicle.

By a fuel vapour canister heating system according to the above, the energy consumption of the EVAP could be reduced. Further, the amount of fuel vapour that emerges from the fuel tank is increased when the outside temperature at the vehicle is high and this thus coincides with the heat that could be picked up and transferred to the fuel canister by the fuel vapour canister heating system, i.e. the capacity of the fuel vapour canister heating system is increased when the occurrence of fuel vapour is increased.

By pick-up of heat is meant that the fuel vapour heating system picks-up energy from the heat at the surroundings of vehicle and/or energy in parts of the vehicle that has been heated by the surroundings. The picked-up energy heats a refrigerant fluid in the fuel vapour heating system.

According to some embodiments, the first heat exchanger is at least positioned at an exterior surface of the vehicle, such as a body panel of a roof, a trunk or a side of the vehicle.

An advantage of this is that the fuel vapour canister heating system reduces the heat in the body panels of the vehicle. This will in turn improve the climate comfort of the vehicle and the energy consumption used by the HVAC-system of the vehicle to lower the temperature in the vehicle could be reduced.

A further advantage is that the first heat exchanger is positioned at positions of the vehicle where a lot of heat occurs and is created.

According to some embodiments, the first heat exchanger comprises a tube positioned at or in a body panel of the vehicle. By having the tube in or at the body panel, the body panel protects the first heat exchanger and it is positioned at a position where it could pick-up a lot of heat.

According to some embodiments, the second heat exchanger is positioned at the fuel vapour canister. By having the second heat exchanger positioned at the fuel vapour canister the efficiency in heat transfer to the fuel vapour canister is increased and heat losses is reduced.

According to some embodiments, the second heat exchanger comprises a tube positioned at the fuel vapour canister.

According to some embodiments, the tube of the second heat exchanger is wrapped around the fuel vapour canister. By wrapping the tube of the fuel vapour canister around the fuel canister, an easy connection between the tube and the fuel vapour canister is achieved and the efficiency in heat transfer to the fuel vapour canister is increased.

According to some embodiments, the fuel vapour heating system is fluidly connected in series to the fuel tank and the combustion engine and fluidly positioned between the fuel tank and the combustion engine.

By using the flow of fuel from the fuel tank to the combustion engine, no extra energy or components needs to be used to regulate the transfer of heat between the first and second heat exchangers.

According to some embodiments, an inlet of the first heat exchanger is fluidly connected to the fuel tank, an outlet of the first heat exchanger is fluidly connected to an inlet of the second heat exchanger and an outlet of the second heat exchanger is fluidly connected to the combustion engine and the fuel is configured to flow in the first heat exchanger and the second heat exchanger and the first and second heat exchangers are configured to use the fuel as a heat transfer fluid.

By using the flow of fuel from the fuel tank on its way to the combustion engine as the heat transfer fluid of the first and second heat exchangers, no extra energy or components needs to be used to regulate the transfer of heat between the first and second heat exchangers.

According to some embodiments, the outlet of the second heat exchanger is fluidly connected to the fuel tank.

According to some embodiments, the vehicle comprises an outlet valve connected to the outlet of the second heat exchanger, the combustion engine and the fuel tank and configured to regulate the flow of fuel from the second heat exchanger to the combustion engine and the fuel tank. The outlet valve could regulate the flow in the first and second heat exchangers in the fuel vapour heating system in a way that is independent of the actual flow of fuel transferred from the fuel tank to the combustion engine.

According to some embodiments, the vehicle comprises an inlet valve connected to the fuel tank, the fuel vapour canister heating system and the combustion engine and configured to regulate the flow of fuel from the fuel tank to the fuel vapour canister heating system and the combustion engine.

An advantage of the inlet valve is that the flow of fuel from the fuel tank to the combustion engine is regulated in a way that is independent of the actual flow of fuel in the first and second heat exchangers in the fuel vapour heating system.

According to some embodiments, the inlet valve is configured to regulate the flow of fuel between the fuel vapour canister heating system and the combustion engine at least based on a temperature of the surroundings of the vehicle and/or the temperature of the fuel vapour canister.

By regulating the flow of fuel to the fuel vapour heating system based on the temperature of the surroundings, it could be regulated to be active when the surrounding temperature is high enough for the system to be needed and the system decreases the total energy consumption.

Further, by regulating the flow of fuel to the fuel vapour canister heating system based on the temperature of the fuel it could be regulated to be active when there is an increase in created fuel vapours that needs to be transferred to the canister.

According to some embodiments, the vehicle comprises a fuel pump connected to the fuel tank, the combustion engine and the fuel vapour canister heating system and configured to pump fuel from the fuel tank to the combustion engine and/or the fuel vapour canister heating system.

According to some embodiments, the vehicle comprises a back valve connected to the fuel tank and the fuel vapour canister heating system and configured to regulate a flow of fuel from the fuel vapour canister heating system to the fuel tank to drain the fuel vapour canister heating system of fuel.

According to some embodiments, the first heat exchanger comprises at least a first and a second part, the first part is positioned at a first body panel of the vehicle and the second part is positioned at a second body panel of the vehicle.

By having the first heat exchanger at several parts of the body panel, the heat picked up from the surroundings could be increased.

According to some embodiments, the vehicle comprises a sensor configured to sense a position of the sun in relation to the vehicle. The fuel vapour canister heating system is configured to regulate the flow of fuel to the first and/or second part of the first heat exchanger at least based on the position of the sun.

By having the first heat exchanger at several parts of the body panel, the heat picked up from the surroundings could be optimized based on the position of the sun to pick up the heat from the surroundings.

The present invention will become apparent from the detailed description given below. The detailed description and specific examples discloses preferred embodiments of the invention by way of illustration only. Those skilled in the art understand from guidance in the detailed description that changes and modifications may be made within the scope of the invention.

Hence, it is to be understood that the herein disclosed invention is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present invention, will be more fully appreciated by reference to the following illustrative and non-limiting detailed description of example embodiments and aspects of the present invention, when taken in conjunction with the accompanying drawings.

DETAILED DESCRIPTION

The present invention will now be described with reference to the accompanying drawings, in which preferred example embodiments and aspects of the invention are shown. The invention may, however, be embodied in other forms and should not be construed as limited to the herein disclosed embodiments. The disclosed embodiments are provided to fully convey the scope of the invention to the skilled person.

With surroundings is meant circumstances and conditions by which the vehicle is surrounded, e.g. conditions of the ambient air around the vehicle such as temperature or the amount of solar radiation falling onto the vehicle thereby heating at least the part of the vehicle onto which the solar radiation falls. The sun may cause a direct heating by means of the incoming solar radiation on the vehicle itself or indirect heating by heating the ambient air around the vehicle.

Figure 1:
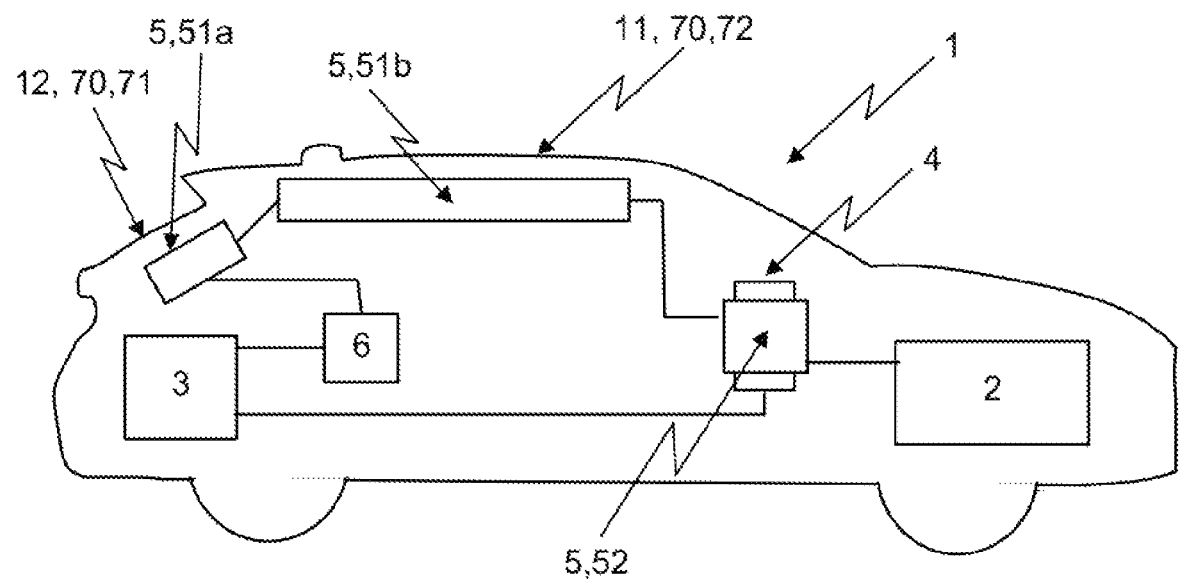
FIG. 1 shows a schematically side view of a vehicle according to an aspect of the present disclosure.
Figure 2:
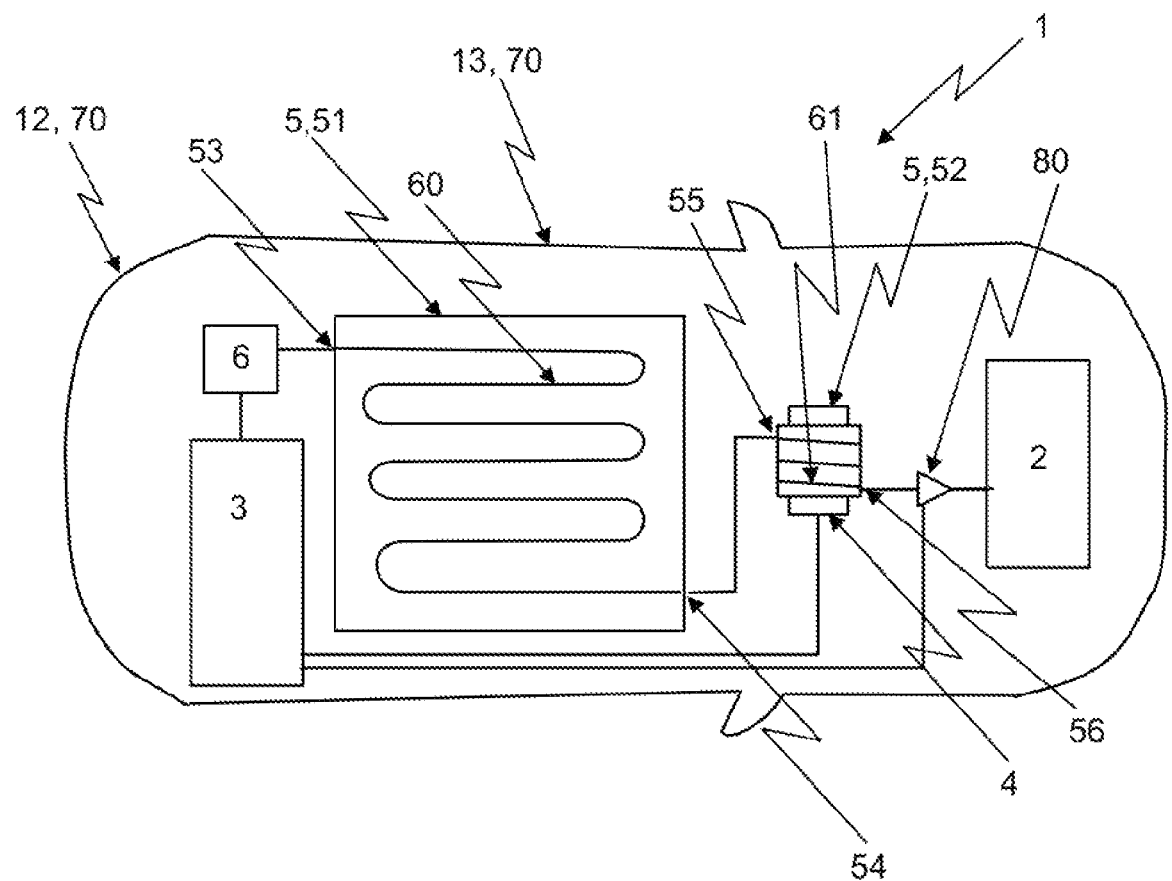
FIG. 2 shows a schematically top view of a vehicle according to an aspect of the present disclosure.

The FIGS. 1 and 2 disclose a vehicle 1. The disclosure shows the vehicle 1 comprising a combustion engine 2, a fuel tank 3, a fuel vapour canister 4 and a fuel vapour canister heating system 5.

The fuel tank 3 is connected to the combustion engine 2. The fuel tank 3 is configured to store fuel and supply fuel to the combustion engine 2.

The fuel vapour canister 4 is connected to the fuel tank 3. The fuel vapour canister 4 is configured to store fuel vapour from the fuel tank 3.

The combustion engine 2, the fuel tank 3 and the fuel vapour canister 4 as such is known in the art and will thus not be described in more detail herein.

The fuel vapour canister heating system 5 comprises a first heat exchanger 51 and a second heat exchanger 52. The second heat exchanger 52 is fluidly connected in series to the first heat exchanger 51.

The first heat exchanger 51 is configured to pick-up heat from surroundings of the vehicle 1. According to an aspect the first heat exchanger 51 is configured to pick-up heat from the air surrounding the vehicle 1. According to an aspect the first heat exchanger 51 is configured to pick-up heat from the sun shining on the vehicle 1.

By pick-up of heat is meant that the fuel vapour heating system picks-up energy from the heat at the surroundings of vehicle and/or energy in parts of the vehicle that has been heated by the surroundings. The picked-up energy heats a refrigerant fluid in the fuel vapour heating system.

The second heat exchanger 52 is configured to transfer heat picked-up by the first heat exchanger 51 to the fuel vapour canister 4 to heat the fuel vapour canister 4.

Figure 4:
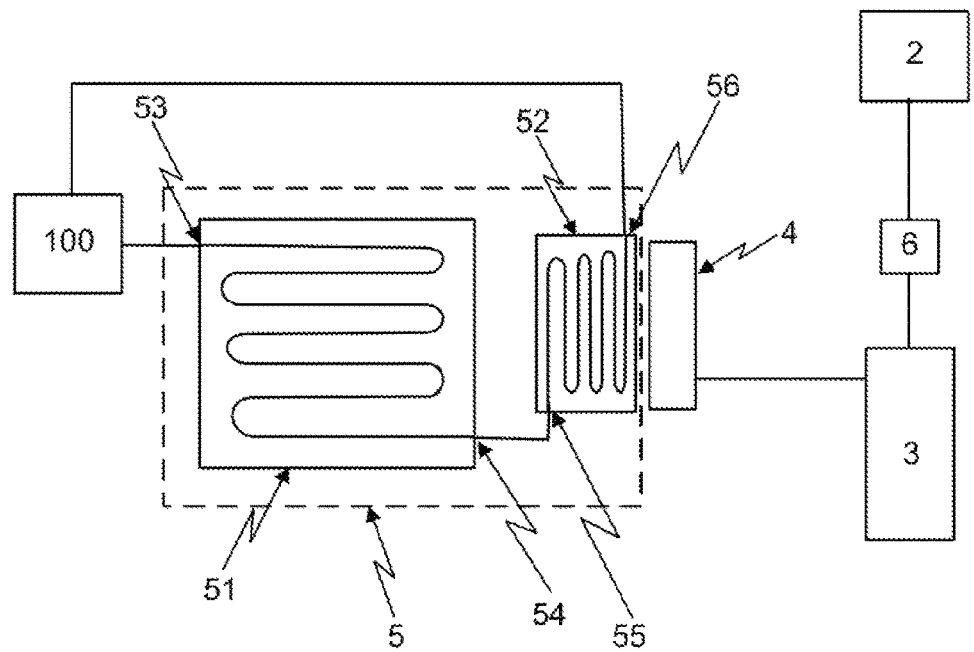
FIG. 4 shows a schematically view of a combustion engine, fuel tank, a canister and a fuel vapour heating system according to an aspect of the present disclosure.

According to an aspect the fuel vapour canister heating system 5 is fluidly connected in series to a fluid tank 100, as is disclosed in FIG. 4. The fluid tank 100 comprises a refrigerant fluid that is configured to flow in the fuel vapour canister heating system 5.

According to an aspect the fluid tank 100 is connected to a pump. The pump is configured to pump the fluid from the fluid tank 100 and into the fuel vapour canister heating system 5. The pump is thus configured to pump the fluid to flow in the first heat exchanger 51 and the second heat exchanger 52 to transfer heat from the surroundings of the vehicle 1 to the fuel vapour canister 4.

According to an aspect the fuel vapour heating system 5 is fluidly connected in series to the fuel tank 3 and the combustion engine 2 and fluidly positioned between the fuel tank 3 and the combustion engine 2.

According to an aspect the fluid tank 100 is the fuel tank 3 of the vehicle 1.

According to an aspect the first heat exchanger 51 is at least positioned at an exterior surface 10 of the vehicle 1, as is disclosed in FIGS. 1 and 2. According to an aspect the exterior surface of the vehicle 1 is a body panel 70 of the vehicle 1. According to an aspect the body panel 70 is a roof 11 of the vehicle 1. According to an aspect the body panel 70 is a trunk 12 of the vehicle 1. According to an aspect the body panel 70 is a side 13 of the vehicle 1.

According to an aspect the first heat exchanger 51 comprises a tube or pipe/piping 60 positioned at or in the body panel 70 of the vehicle 1. The fluid in the first heat exchanger 51 flows in the tube 60.

The second heat exchanger 52 is according to an aspect positioned at the fuel vapour canister 4.

Figure 3:
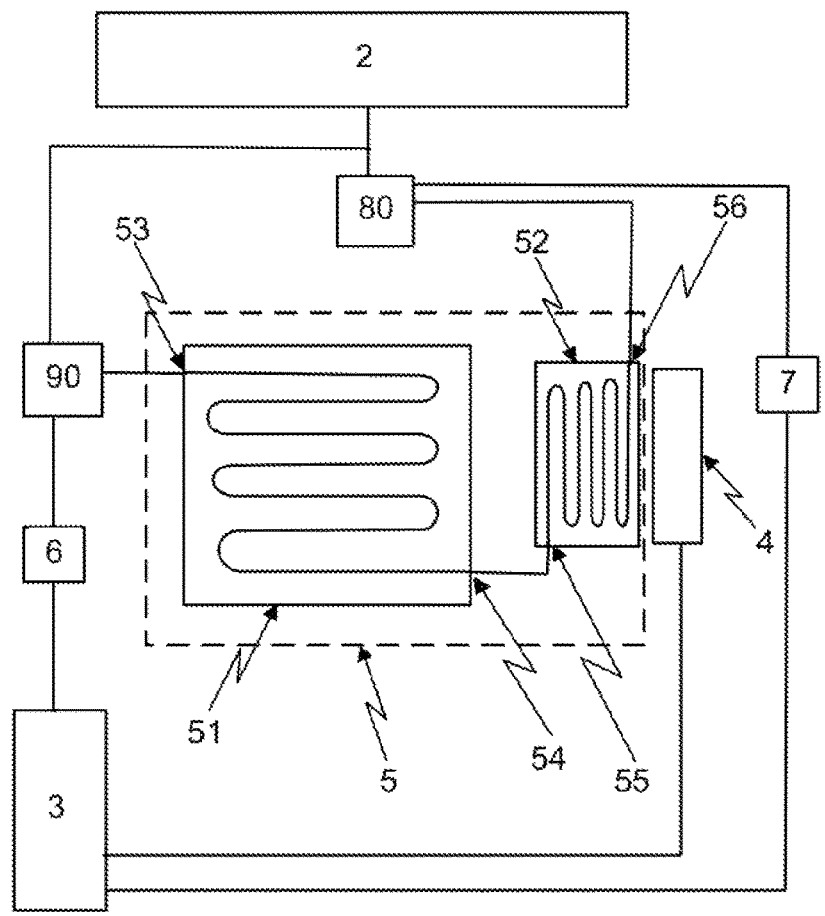
FIG. 3 shows a schematically view of a combustion engine, fuel tank, a canister and a fuel vapour heating system according to an aspect of the present disclosure.

According to an aspect the second heat exchanger 52 comprises a tube or pipe/piping 61 positioned at the fuel vapour canister 4 as is disclosed in FIG. 3. The fluid in the second heat exchanger 52 flows in the tube 61.

According to an aspect the tube 61 of the second heat exchanger 52 is wrapped around the fuel vapour canister 4 as is disclosed in FIG. 2.

According to an aspect the first heat exchanger 51 comprises an inlet 53 and an outlet 54. A fluid enters into the first heat exchanger via the inlet 53 and exits via the outlet 54. According to an aspect the second heat exchanger 52 comprises an inlet 55 and an outlet 56. The fluid enters into the second heat exchanger via the inlet 55 and exits via the outlet 56.

The outlet 54 of the first heat exchanger 51 is fluidly connected to the inlet 55 of the second heat exchanger 52. The fluid of the fuel vapour canister heating system 5 is configured to flow in the first heat exchanger 51 and the second heat exchanger 52. The fluid flows into the first heat exchanger 51 via the inlet 53, through the first heat exchanger 51 and thereafter leaves the first heat exchanger 51 via the outlet 54. The fluid thus acts as the refrigerant of the first heat exchanger 51. The fluid is heated as the first heat exchanger 51 transfers heat from its surroundings, such as the sun, to the fluid. The heated fluid exiting the outlet 54 of the first heat exchanger 51 thereafter flows towards the second heat exchanger 52 in a tube or pipe and flows into the second heat exchanger 52 via its inlet 54. The fluid flows in the second heat exchanger 52 and the heat in the fluid is transferred to the canister 4 by the second heat exchanger 52. The fluid is cooled and the canister 4 is heated. As the canister 4 is heated, it can receive more fuel vapour from the fuel tank 3.

According to an aspect the first and second heat exchangers 51, 52 are configured to use the fluid in the fluid tank 100 as a heat transfer fluid i.e. the refrigerant of the fuel vapour canister heating system 5. The inlet 53 of the first heat exchanger 51 is fluidly connected to the fluid tank 100. The fluid in the fluid tank 100 is used as the fluid of the fuel vapour canister heating system 5. The fluid in the fluid tank 100 is according to this aspect configured to flow in the first heat exchanger 51 and the second heat exchanger 52. The fluid flows from the fluid tank 100 into the first heat exchanger 51 via the inlet 53, through the first heat exchanger 51 and thereafter leaves the first heat exchanger 51 via the outlet 54. The fluid is heated as the first heat exchanger 51 transfers heat from its surroundings, such as the sun, to the fluid. The heated fluid exiting the outlet 54 of the first heat exchanger 51 thereafter flows towards the second heat exchanger 52 in the tube or pipe and flows into the second heat exchanger 52 via its inlet 54. The fluid flows in the second heat exchanger 52 and the heat from the fluid is transferred to the canister 4 by the second heat exchanger 52. The fluid is cooled and the canister 4 is heated. As the canister 4 is heated, it can receive more fuel vapour from the fuel tank 3. The fluid exiting the second heat exchanger 52 is returned to the fluid tank 100 and could be recirculated in the system.

According to an aspect the first and second heat exchangers 51, 52 are configured to use the fuel in the fuel tank 3 as a heat transfer fluid i.e. the refrigerant of the fuel vapour canister heating system 5. The inlet 53 of the first heat exchanger 51 is fluidly connected to the fuel tank 3. The fuel will act as the fluid of the fuel vapour canister heating system 5. The fuel in the fuel tank 3 is according to this aspect configured to flow in the first heat exchanger 51 and the second heat exchanger 52. The fuel flows from the fuel tank 3 into the first heat exchanger 51 via the inlet 53, through the first heat exchanger 51 and thereafter leaves the first heat exchanger 51 via the outlet 54. The fuel is heated as the first heat exchanger 51 transfers heat from its surroundings, such as the sun, to the fuel. The heated fuel exiting the outlet 54 of the first heat exchanger 51 thereafter flows towards the second heat exchanger 52 in the tube or pipe and flows into the second heat exchanger 52 via its inlet 54. The fuel flows in the second heat exchanger 52 and the heat from the fuel is transferred to the canister 4 by the second heat exchanger 52. The fuel is cooled and the canister 4 is heated. As the canister 4 is heated, it can receive more fuel vapour from the fuel tank 3.

According to an aspect the outlet 56 of the second heat exchanger 52 is fluidly connected to the fuel tank 3. Fuel exiting the second heat exchanger 52 could thus flow back into the fuel tank 3, as is disclosed in FIG. 3.

According to an aspect the outlet 56 of the second heat exchanger 52 is fluidly connected to the combustion engine 2. Fuel exiting the second heat exchanger 52 could thus flow into the combustion engine 2, as is disclosed in FIG. 3.

According to an aspect the outlet 56 of the second heat exchanger 52 is fluidly connected to the combustion engine 2 and the fuel tank 3. Fuel exiting the second heat exchanger 52 could thus flow into the combustion engine 2, into the fuel tank 3 or partly into the combustion engine 2 and partly into the fuel tank 3, as is disclosed in FIG. 3.

According to an aspect the vehicle 1 comprises an outlet valve 80 connected to the outlet 56 of the second heat exchanger 52, the combustion engine 2 and the fuel tank 3 and configured to regulate distribute the flow of fuel from the second heat exchanger 52 to the combustion engine 2 and the fuel tank 3, as is disclosed in FIG. 3. The valve 80 is positioned between the combustion engine 2, the fuel tank 3 and the fuel vapour canister heating system 5. By having the outlet valve 80 being configured to regulate the flow of fuel exiting the second heat exchanger 52, and thereby also the flow of fuel exiting the fuel vapour canister heating system 5, the canister 4 could be heated with a larger flow of fluid in the fuel vapour canister heating system 5 than the amount of fluid that should be supplied to the combustion engine 2.

According to an aspect the vehicle 1 comprises an inlet valve 90 connected to the fuel tank 3, the fuel vapour canister heating system 5 and the combustion engine 2, as is disclosed in FIG. 3. The inlet valve 90 is configured to regulate the flow of fuel from the fuel tank 3 to the fuel vapour canister heating system 5 and the combustion engine 2. The inlet valve 90 regulates the amount of fuel that is supplied directly to the combustion engine 2 and the amount of fuel that is supplied to the fuel vapour canister heating system 5. By this, the amount of fuel supplied to the combustion engine 2 is not dependent on the amount of flow needed in the fuel vapour canister heating system 5. The flow of fuel supplied to the combustion engine 2 could be larger than the flow of fuel desired in the fuel vapour canister heating system 5.

According to an aspect the inlet valve 90 is configured to regulate the flow of fuel between the fuel vapour canister heating system 5 and the combustion engine 2 at least based on a temperature of the surroundings of the vehicle 1. According to an aspect the inlet valve 90 is configured to regulate the flow of fuel between the fuel vapour canister heating system 5 and the combustion engine 2 at least based on a temperature of the surroundings of the vehicle 1 and the temperature of the fuel vapour canister 4. According to an aspect the inlet valve 90 is configured to regulate the flow of fuel between the fuel vapour canister heating system 5 and the combustion engine 2 at least based on a temperature of the fuel vapour canister 4.

According to an aspect the fuel vapour canister heating system 5 is configured to regulate the flow of fluid between the fuel vapour canister heating system 5 and the fluid tank 100 at least based on a temperature of the surroundings of the vehicle 1. According to an aspect the fuel vapour canister heating system 5 is configured to regulate the flow of fluid between the fluid tank 100 and the combustion engine 2 at least based on a temperature of the surroundings of the vehicle 1 and the temperature of the fuel vapour canister 4. According to an aspect the fuel vapour canister heating system 5 is configured to regulate the flow of fluid between the fuel vapour canister heating system 5 and the fluid tank 100 at least based on a temperature of the fuel vapour canister 4.

According to an aspect the vehicle comprises a fuel pump 6. According to an aspect the pump is the fuel pump 6 of the vehicle 1, as is disclosed in FIG. 3. The fuel pump 6 is connected to the fuel tank 3, the combustion engine 2 and the fuel vapour canister heating system 5. The fuel pump 6 is according to an aspect configured to pump fuel from the fuel tank 3 to the combustion engine 2. The fuel pump 6 is according to an aspect configured to pump fuel from the fuel tank 3 to the fuel vapour canister heating system 5. The fuel pump 6 is according to an aspect configured to pump fuel from the fuel tank 3 to the combustion engine 2 and the fuel vapour canister heating system 5.

According to an aspect, as is disclosed in FIG. 3, the vehicle 1 comprises a back valve 7 connected to the fuel tank 3 and the fuel vapour canister heating system 5. The back valve 7 is configured to regulate a flow of fuel from the fuel vapour canister heating system 5 to the fuel tank 3 to drain the fuel vapour canister heating system 5 of fuel. The back valve 7 could restrict the flow of fuel from the fuel vapour canister heating system 5 to flow back to the fuel tank 3 and the fuel in the fuel vapour canister heating system 5 will then stay in the fuel vapour canister heating system 5. The back valve 7 could allow flow of fuel from the fuel vapour canister heating system 5 to flow back to the fuel tank 3. The fuel vapour canister heating system 5 could then be drained from fuel as it flows from the fuel vapour canister heating system 5 to the fuel tank 3.

According to an aspect the back valve 7 is connected to the fluid tank 100 and the fuel vapour canister heating system 5. The back valve 7 is configured to regulate a flow of fluid from the fuel vapour canister heating system 5 to the fluid tank 100 to drain the fuel vapour canister heating system 5 of fluid. The back valve 7 could restrict the flow of fluid from the fuel vapour canister heating system 5 to flow back to the fluid tank 100 and the fluid in the fuel vapour canister heating system 5 will then stay in the fuel vapour canister heating system 5. The back valve 7 could allow flow of fluid from the fuel vapour canister heating system 5 to flow back to the fluid tank 100. The fuel vapour canister heating system 5 could then be drained from fluid as it flows from the fuel vapour canister heating system 5 to the fluid tank 100.

According to an aspect the first heat exchanger 51 comprises at least a first and a second part 51*a*, 51*b*, as is disclosed in FIG. 1. The first part 51*a* is positioned at a first body panel 70, 71 of the vehicle 1. The second part 51*b* is positioned at a second body panel 70, 72 of the vehicle 1.

According to an aspect the first body panel 71 is the roof 11 of the vehicle 1. According to an aspect the first body panel 71 is the trunk 12 of the vehicle 1. According to an aspect the first body panel 71 is the side 13 of the vehicle 1.

According to an aspect the second body panel 72 is the roof 11 of the vehicle 1. According to an aspect the second body panel 72 is the trunk 12 of the vehicle 1. According to an aspect the second body panel 72 is the side 13 of the vehicle 1.

According to an aspect the vehicle 1 comprises a sensor configured to sense a position of the sun in relation to the vehicle 1 and wherein the fuel vapour canister heating system 5 is configured to regulate the flow of fuel to the first and/or second part 51*a*, 51*b* of the first heat exchanger 51 at least based on the position of the sun. According to an aspect the sensor is a temperature sensor. According to an aspect the sensor is a light sensor. By regulating the flow the fuel vapour heating canister system 5 to the first and/or second part 51*a*, 51*b* of the first heat exchanger 51 the flow could be directed to the position that is hottest and where it could pick up the most amount of energy, i.e. heat, from the surroundings and the sun.

Hereafter an example of how the fuel vapour canister heating system 5 is run will be described in more detail. If the vehicle 1 is standing in the sun, the sun will heat the vehicle 1 including its fuel tank 3. The fuel in the fuel tank 3 will vaporize more as it is heated and the fuel vapour from the fuel tank will be collected by the fuel vapour canister 4. As more and more fuel vapour is formed in the fuel tank 3, there is a risk of that the fuel vapour canister 4 gets full and cannot receive more fuel vapour from the fuel tank 3. To increase the capacity of the fuel vapour canister it could be heated. The fuel vapour canister heating system 5 is initiated to heat the fuel vapour canister 4 to increase the capacity. The fuel vapour canister heating system 5 could according to an aspect be automatically initiated based on input to the fuel vapour canister heating system 5. According to an aspect the fuel vapour canister heating system 5 is initiated when the used capacity of the fuel vapour canister 4 is above a pre-set percentage or when the temperature of the surroundings of the vehicle 1 is above a pre-set temperature. When the fuel vapour canister heating system 5 is initiated, fluid starts to flow in the fuel vapour canister heating system 5. The flow of fluid in the first heat exchanger 51 picks up heat from the surroundings of the vehicle 1. As the need for an increased capacity of the fuel vapour canister 4 often occurs at high temperatures at the vehicle 1, the need for heating the fuel vapour canister 4 often coincides with that the temperature of the surroundings are high. The heat surrounding the vehicle 1 heats the fluid in the first heat exchanger 51 and thereafter the fluid flows towards the second heat exchanger 52. In the second heat exchanger 52 the heat, i.e. the energy, from the fluid flowing to the first heat exchanger 51 is transferred to the fuel vapour canister 4. The fuel vapour canister 4 thus is heated by the second heat exchanger 52 and as the temperature of the fuel vapour canister is increased, the capacity of the fuel vapour canister 4 is increased and it is able to receive more fuel vapours from the fuel tank 3.

The person skilled in the art realizes that the present invention is not limited to the preferred embodiments described above. The person skilled in the art further realizes that modifications and variations are possible within the scope of the appended claims. Additionally, variations to the disclosed embodiments can be understood and effected by the skilled person in practicing the claimed invention, from a study of the drawings, the disclosure, and the appended claims.

Generally, when an arrangement is referred to herein, it is to be understood as a physical product; e.g., an apparatus or a system. The physical product may comprise one or more parts, such as controlling circuitry in the form of one or more controllers, one or more processors, or the like.

The described embodiments, aspect and their equivalents may be realized in software, hardware, or a combination thereof. The embodiments may be performed by general-purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general-purpose circuitry and/or the specialized circuitry may, for example, be associated with or comprised in an apparatus such as a vehicle.

Embodiments and aspect may appear within an electronic apparatus (associated with or comprised in a vehicle) comprising arrangements, circuitry, and/or logic according to any of the embodiments described herein. Alternatively or additionally, an electronic apparatus (associated with or comprised in a vehicle) may be configured to perform methods according to any of the embodiments described herein.

Generally, all terms used herein are to be interpreted according to their ordinary meaning in the relevant technical field, unless a different meaning is clearly given and/or is implied from the context in which it is used.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

What is claimed is:

1. A vehicle, comprising:
   a combustion engine,
   a fuel tank connected to the combustion engine to supply fuel to the combustion engine,
   a fuel vapour canister connected to the fuel tank and configured to store fuel vapour from the fuel tank, and
   a fuel vapour canister heating system, wherein the fuel vapour canister heating system comprises:
     a first heat exchanger, and
     a second heat exchanger fluidly connected in series to the first heat exchanger,
     wherein the first heat exchanger is configured to pick-up heat from solar heating of a surroundings of the vehicle, and the second heat exchanger is configured to transfer heat picked-up by the first heat exchanger to the fuel vapour canister to heat the fuel vapour canister,
     wherein the first heat exchanger is positioned at a body panel of the vehicle that forms an exterior surface of the vehicle, and
     wherein the fuel vapour canister heating system is initiated by passing heat transfer fluid through the first and second heat exchangers upon determining that a temperature of the surroundings of the vehicle is above a pre-set temperature.

2. The vehicle according to claim 1, wherein the exterior surface of the vehicle is one of a roof, a trunk or a side of the vehicle.

3. The vehicle according to claim 2, wherein the first heat exchanger comprises a tube positioned at or in the body panel of the vehicle.

4. The vehicle according to claim 1, wherein the second heat exchanger is positioned at the fuel vapour canister.

5. The vehicle according to claim 1, wherein the second heat exchanger comprises a tube positioned at the fuel vapour canister.

6. The vehicle according to claim 5, wherein the tube of the second heat exchanger is wrapped around the fuel vapour canister.

7. The vehicle according to claim 1, wherein the fuel vapour canister heating system is fluidly connected in series to the fuel tank and the combustion engine, and fluidly positioned between the fuel tank and the combustion engine so that the heat transfer fluid is fuel from the fuel tank.

8. The vehicle according to claim 1, wherein an inlet of the first heat exchanger is fluidly connected to the fuel tank, an outlet of the first heat exchanger is fluidly connected to an inlet of the second heat exchanger and an outlet of the second heat exchanger is fluidly connected to the combustion engine and the fuel is configured to flow in the first heat exchanger and the second heat exchanger and the first and second heat exchangers are configured to use the fuel as the heat transfer fluid.

9. The vehicle according to claim 8, wherein the outlet of the second heat exchanger is fluidly connected to the fuel tank.

10. The vehicle according to claim 9, comprising an outlet valve connected to the outlet of the second heat exchanger, the combustion engine, and the fuel tank, and the outlet value is configured to regulate the flow of fuel from the second heat exchanger to the combustion engine and the fuel tank.

11. The vehicle according to claim 1, comprising an inlet valve connected to the fuel tank, the fuel vapour canister heating system, and the combustion engine, and the inlet value is configured to regulate the flow of fuel from the fuel tank to the fuel vapour canister heating system and the combustion engine.

12. The vehicle according to claim 11, wherein the inlet valve is configured to regulate the flow of fuel between the fuel vapour canister heating system and the combustion engine at least based on at least one of the temperature of the surroundings of the vehicle or a temperature of the fuel vapour canister.

13. The vehicle according to claim 1, comprising a fuel pump connected to the fuel tank, the combustion engine, and the fuel vapour canister heating system, and the fuel pump is configured to pump fuel from the fuel tank to at least one of the combustion engine or the fuel vapour canister heating system.

14. The vehicle according to claim 1, comprising a back valve connected to the fuel tank and the fuel vapour canister heating system, and the back valve is configured to regulate the flow of fuel from the fuel vapour canister heating system to the fuel tank to drain the fuel vapour canister heating system of fuel.

15. The vehicle according to claim 1, wherein the first heat exchanger comprises at least a first and a second part and wherein the first part is positioned at a first body panel of the vehicle and the second part is positioned at a second body panel of the vehicle.

16. The vehicle according to claim 15, comprising a sensor configured to sense a position of the sun in relation to the vehicle and wherein the fuel vapour canister heating system is configured to regulate the flow of fuel to the first and/or second part of the first heat exchanger at least based on the position of the sun.

\* \* \* \* \*